United States Patent [19]

White

[11] 3,889,027

[45] June 10, 1975

[54] RETROREFLECTIVE FILM
[75] Inventor: Michael L. White, Morrisville, Pa.
[73] Assignee: Rohm and Haas Company, Philadelphia, Pa.
[22] Filed: Apr. 12, 1974
[21] Appl. No.: 460,638

Related U.S. Application Data
[63] Continuation-in-part of Ser. No. 238,046, March 27, 1972, abandoned.

[52] U.S. Cl. .................. 428/34; 156/196; 156/209; 156/210; 156/219; 156/292; 350/100; 350/104; 350/106; 350/109; 350/288; 428/161
[51] Int. Cl. ............................................. B44f 1/02
[58] Field of Search .............. 161/1, 2, 4, 5, 6, 122, 161/146; 156/196, 209, 210, 219, 292; 350/100, 104, 106, 109, 288; 404/14, 93

[56] References Cited
UNITED STATES PATENTS

| | | | |
|---|---|---|---|
| 2,124,793 | 7/1938 | Persons | 350/106 |
| 2,273,847 | 2/1942 | Eckel | 350/104 |
| 2,948,191 | 8/1960 | Hodgson, Jr. et al. | 161/6 |
| 3,155,764 | 11/1964 | Gill, Jr. | 161/4 |
| 3,176,584 | 4/1965 | De Vries et al. | 161/4 |
| 3,716,445 | 2/1973 | Lemelson | 161/4 |

*Primary Examiner*—George F. Lesmes
*Assistant Examiner*—Charles E. Lipsey

[57] ABSTRACT

A retroreflective film comprising a lamination of a first base layer having vacuum metallized hemispherical depressions on one surface thereof and a second layer having substantially hemispherical projections from the surface thereof formed from an optically transparent film wherein the first and second layers are arranged so that the hemispherical depressions of the base layer and the substantially hemispherical projections of the intermediate layer are concentrically arranged and the radius of the hemispherical depressions of the base layer is greater than the radius of the substantially hemispherical projections of the second layer. A laminate construction with matched opposing substantially hemispherical projections on the second layer is preferably provided with a third optically clear overlay film.

4 Claims, 3 Drawing Figures

RETROREFLECTIVE FILM

This is a continuation-in-part of U.S. Ser. No. 238,046, filed Mar. 27, 1972 now abandoned.

The present application relates to materials having retroreflective surfaces which reflect incident light back toward its source. More particularly, it relates to materials having surfaces so constructed that incident light is reflected toward the light source, irrespective of the angle of incident light to the surface. Still more particularly, the present invention relates to surfaces which, when subjected to a light source, cause the surfaces to appear brightly illuminated to an observer located near the light source.

Retroreflective surfaces are widely employed for their ability to improve visibility at night, particularly in wet or rainy conditions. Highway signs are a major area where retroreflective surfaces have been employed with remarkable improvement in night time visibility to motorists and the like. Other areas where retroreflective surfaces have been employed include reflectors for vehicles, high visibility apparel for pedestrians and cyclists, and the like. For example, many states now require operators of motorcycles to wear helmets having a minimum area of retroreflective surfaces. The ability of such surfaces to increase night visibility, particularly in wet conditions, provides the motorist and others with additional opportunity to react to highway signs and/or obstructions and hazards, which serves as a substantial aid in the avoidance of traffic accidents and the like.

Normal reflection of light from a planar surface is a well known and clearly understood phenomena. Even those unskilled in the art are able to imagine light "bounding" from a surface, in accordance with a simple geometric relationship. While a more complete and technically accurate understanding is more complex, those skilled in the art are amply able to deal with the phenomenon. A consideration of retroreflectivity, i.e., reflectivity where the incident light is returned toward its source, is far more complex and the laymen's understanding cannot be relied upon to deal with or to attain the desired properties. In FIG. 1, the behavior of a retroreflective surface is contrasted with a normal reflective surface. Given a substantially planar reflective surface 11, and fixed point light source 12, incident light, designated by a solid line 13, is reflected by normal reflection from the surface 11 along the dashed line 14. Both the line of incidence 13 and the line of divergence 14 are at fixed and substantially equal angles, $\theta_1$ and $\theta_2$, to the normal to the surface, represented by the solid line 15. The line of divergence 14 represents the line of greatest reflective intensity; in fact, a portion of the reflected light is reflected in other directions than along the line of divergence 14, so that at an angle of up to about $\theta_1 \pm 2°$, a cone of divergent light is formed, having line of divergence 14 as its axis, and comprising a major part of the reflected light. When, on the other hand, planar surface 11 is a retroreflective surface, line 13 generally represents the line of maximum reflective intensity, i.e., forming a cone of divergent light with line 13 as its axis. In actuality, the line of maximum reflective intensity will normally be slightly different from the line of incident light. Since retroreflected light is not normally viewed at precisely the line of incidence, the relative reflective intensity at a particular angle to the line of incidence is of considerable importance. If the reflective intensity at the point of observation is too small, the visibility of the surface at the point of observation may be inferior. In FIG. 1, line 16 at divergence angle to line 13 represents the line of divergence at a pint near, but different from, the light source and it is along this line that the visibility of the surface is noted by an observer. For example, light receiver 17 can be photometric measuring apparatus for laboratory test purposes, but in functional contexts, the light receiver will normally be an observer, such as the driver of a vehicle, disposed at a slightly divergent angle to the incident light from the vehicle headlights. Since it is readily apparent that visibility of the retroreflective surface to such an observer is a primary function of the surface, it is equally apparent that control of reflective intensity at appropriate divergence angles is a necessary element to the successful deployment of retroreflective surfaces.

A variety of properties are of substantial importance to retroreflective surfaces, and have led to the establishment of various minimum performance standards, such as for example, Federal Specification L-S-300A (Sheeting and Tape, Reflective; Non-exposed Lens, Adhesive Backing), which defines flexible, colored, retroreflective films coated on one side with an adhesive protected by a strippable protective liner. Materials which qualify are employed on signs and markers to assure their visibility at night when exposed to a light source, whether the surface is dry or completely wet by rain.

The specification requires a smooth exterior film or coating with spherical lens elements embedded beneath the surface. The adhesive backing can be either pressure-sensitive for manual application or solvent or heat activated for mechanical application. The entire composite must not be thicker than 0.010 inch, exclusive of protective liner.

The specifications also define requirements of a number of optical properties, including color, specular gloss, and reflective intensity at a variety of incidence and divergence angles. Other requirements deal with weatherability, tensile strength, and elongation, resistance to thermal extremes, flexibility, shrinkage, solvent and acid resistance, and the like.

Heretofore, a number of products have been marketed in the field of retroreflective surfaces, including films, tapes, paints and the like. A typical example meeting the minimums established by Federal Specification L-S-300A is characterized by a single layer of tiny transparent glass figures embedded in a thermoset polymeric binder which is backed by a reflector coating and an adhesive with a strippable protective layer and surfaced with a transparent thermoset top coat.

While there have been many variations on the foregoing basic structure, all rely on the employment of glass spheres as lens elements in the material. The employment of glass spheres entails a number of problems in the attainment of high quality retroreflective surfacing materials, since there are great difficulties in attaining uniformity of size and shape of glass beads of the size required. Typically, such retroreflective surface materials employ a single layer of the glass spheres of very small size, which permits the inclusion of as many as 10,000 spheres per square inch, or even more. Even relatively small variations in the size of the spheres on an absolute scale introduce large variations on a relative scale and create a number of problems and difficulties in the preparation of retroreflective surfacing materials. It has proved impossible to attain the relatively narrow variations in the geometry of the optical system required to attain the desired retroreflective characteristics.

A further disadvantage of retroreflective systems employing glass spheres as the optical lens element is in the difficulty of manufacture. The techniques required for attaining a single layer of the glass spheres dispersed in a thermosetting binder are difficult to control and often introduce substantial deficiencies in the required uniformity of the structure.

It is accordingly an object of the present invention to provide a retroreflective surfacing material having a uniform construction which enhances optical performance. Another object of the present invention is to provide a technique for the manufacture of retroreflective materials which attains greater uniformity in the product and thereby enhances optical performance. Still another object is to provide retroreflective surfacing materials having improved physical characteristics, including the ability to withstand weathering. These and still other objects, as will become apparent from the following specifications, are attained by the invention of the present application which comprises a retroreflective surfacing film wherein the optical element is provided in a continuous film.

The drawings are briefly described as follows.

Figure 1:
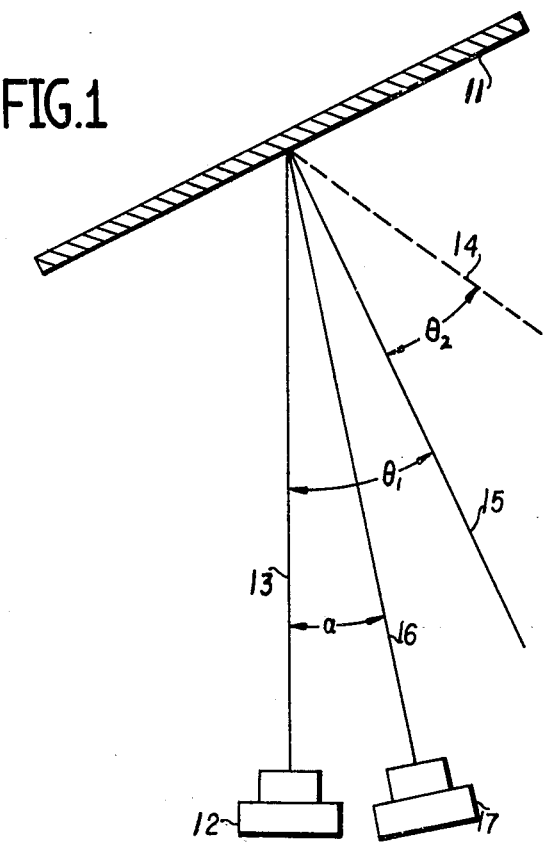
FIG. 1 shows retroreflection from a planar surface.
Figure 2:
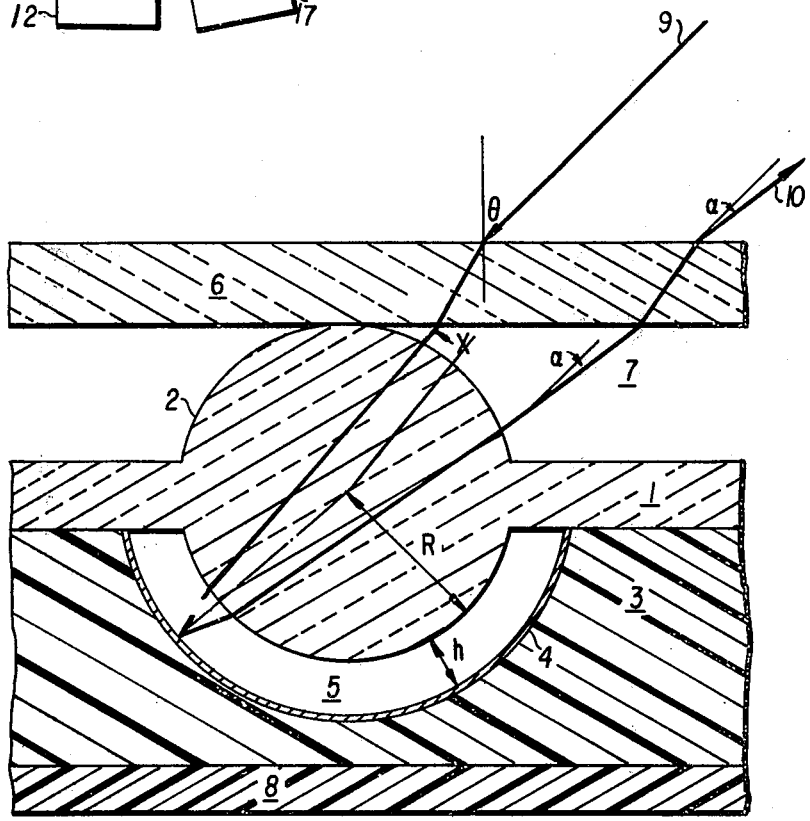
FIG. 2 shows a three-film laminate.

It has been determined that for optimum retroreflective performance the retroreflective surfacing material requires a spherical or hemispherical lens with a reflective backing surface. Such a construction, in accordance with the present invention, is illustrated in FIG. 2, wherein there is provided a transparent film 1, having formed thereon a plurality of lens elements 2. For convenience and understanding the system, only one such lens element is illustrated in FIG. 2. The lens element 2 is conveniently formed by, e.g., embossing transparent film 1 between a set of opposed embossing means in such a manner that by suitable alignment, lens elements 2 will be created on transparent film 1. For convenience, transparent film 1 together with its plurality of lens elements 2 is hereinafter referred to as the optical element. The optical element is provided physical support by a backing film 3 provided with a reflective surface 4 spaced apart from lens element 2 of the optical element by a distance h. The space between the lens element and the reflecting surface 4 can be air or it may be some other suitable material having the requisite optical characteristics. The backing film 3 is coated with a layer of adhesive 8, together with its strippable coating, if required, which is not shown in FIG. 2. The side of the optical element to be exposed to incident light is covered by a transparent overlay film 6, which is spaced apart from the optical element by spacing layer 7. It is preferred that the transparent overlay film be substantially tangent to the plurality of lens element 2. Spacing layer 7 can be air or any other suitable material having requisite optical characteristics.

The divergence angle of a reflected light ray for the defined geometry of FIG. 2 is defined by the following relationship:

$$a = 2\sin^{-1}\left[\frac{X/R}{1+(h/R)}\right] - 4\left\{\sin^{-1}(X/R) - \sin^{-1}[(1/n_f)(X/R)]\right\} \quad (1)$$

so long as incident light 9 passes through some portion of lens element 2 and the spacing layers 5 and 7 are air. In the formula, the divergence angle is defined in terms of X, which is the distance between the light ray and the axis of the lens element parallel to the ray; h, which is the distance between the reflecting surface and the hemisphere defined by spacing layer 5; R, which is the radius of the substantially hemispherical projection and $n_f$, which is the refractive index of the optical element.

The location of the reflecting surface, i.e., the ratio $h/R$ in the expression for the divergence angle, plays a dominant role in determining the optical characteristics of the film. For the highest degree of retroreflectivity, $h/R$ should be selected in such a manner that the divergence angle of the reflective light is minimized. An angle of about 0.2° to 1.0° is usually considered to be most useful for viewing reflective signs at night.

The divergence angle achieves a maximum at some value of X/R which depends on $n_f$ and $h/R$. If this maximum occurs at or near $X/R = 0$, a considerable amount of light is returned at small angles. The optimum value of $h/R$ can therefore be estimated by differentiating the expression for a with respect to $X/R$, setting the resulting equation equal to zero and $X/R$ equal to zero, and solving for $h/R$. This technique yields:

$$h/R = \frac{1\frac{1}{2}\,n_f}{n_f - 1} \quad (2)$$

In practice, slightly lower values than those resulting are required to maximize the amount of light returned at $0 \leq \alpha \leq 1°$.

In a preferred construction of the retroreflective surfacing materials of the present invention, the optical element is formed by passing a clear film between a matched, opposed, synchronized pair of rolls to obtain a film having matched opposed substantially hemispherical projections. The backing layer film, on the other hand, is prepared by embossing, in a similar manner, to develop a singly embossed film. The backing film is vacuum metallized on the embossed side and the lower and upper films are then laminated. A flat overlay film is then applied tangent to the lens spheres of the optical element and an appropriate adhesive backing and strippable protective film are applied to the back. In such a construction, the spacing layers between the optical lens element and the reflecting surface of the backing film and between the optical element and the transparent overlay film are air.

Under normal conditions, the transparent overlay film makes no useful contribution to the optical properties of the design. However, when the exposed surface of the film construction is covered with a clear, foreign substance, such as a water or a screen-processed topcoat, the function of the overlay film becomes apparent. With it, the divergence angle of reflected light is not altered; without it, the divergence angle is usually increased appreciably. In other words, retroreflectivity will be destroyed unless this film construction has an overlay film.

Figure 3:
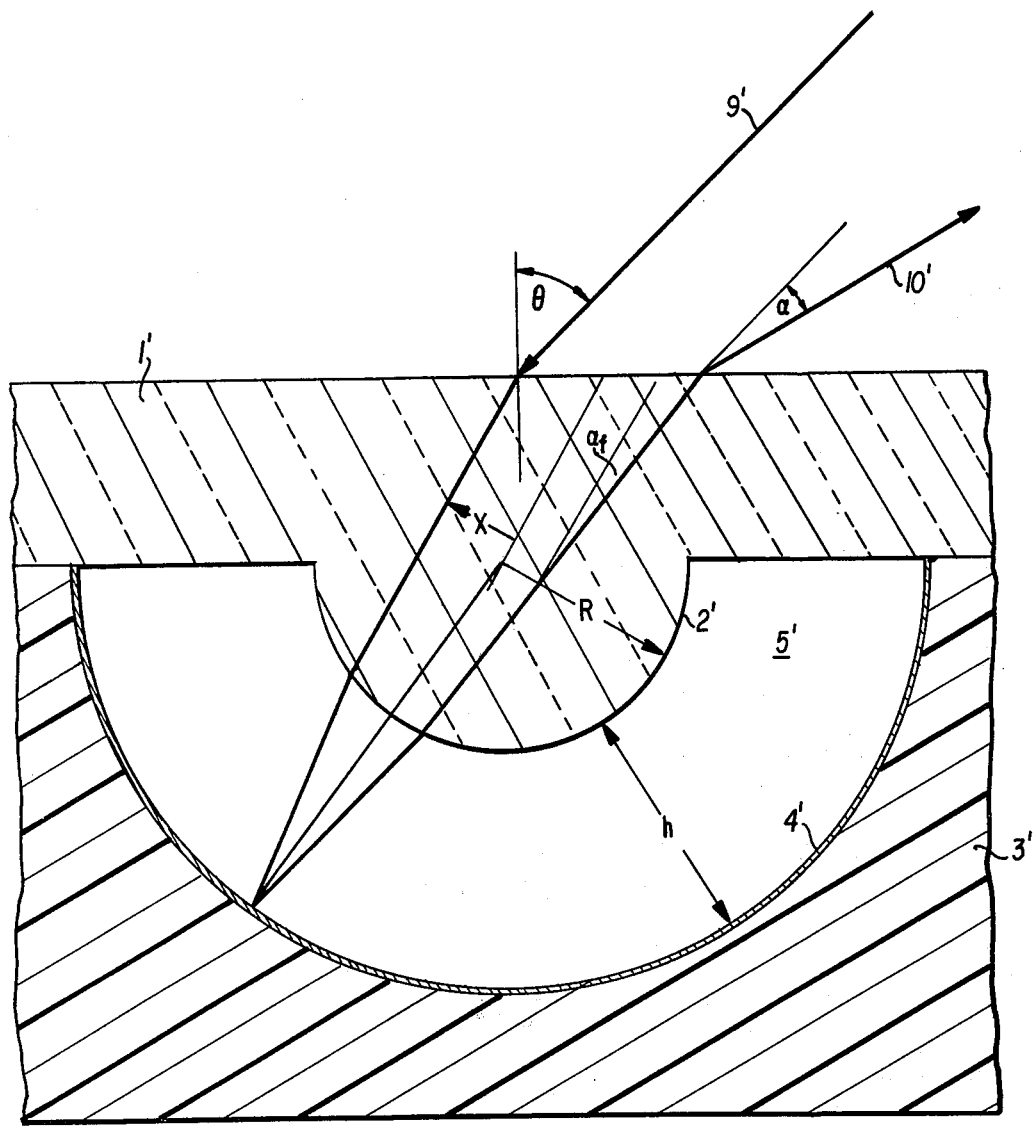
FIG. 3 shows a two-film laminate.

An alternative embodiment is illustrated in FIG. 3 wherein the lens elements of the optical element are hemispheres embossed onto a transparent film layer. In FIG. 3, the reference numbers have the same connotation as do the corresponding numbers in FIG. 2, while those in FIG. 3 are differentiated by primes ('). Because of the difference in construction of the optical element, the lens portion of the optical element does not protrude on the exposed surface of the coating material, and hence an additional transparent overlay is not required.

The optical geometry of the substantially hemispherical lens construction differs slightly from the matched opposed substantially hemispherical lens system. For example, the divergence angle, defined by equation (1) for the latter lens construction becomes:

$$\alpha_f = 2\sin^{-1}(X/R) + \sin^{-1}\left[\frac{n_f(X/R)}{1+(h/R)}\right] \left\{\sin^1[n_f(X/R)]\right\}$$

$$\text{for} \quad 0 \leq X/R \leq 1/n_f \quad (3)$$

$h/R$, corresponding to formula (2), then becomes:

$$h/R = \frac{1}{n_f - 1} \quad (4)$$

For either construction of the retroreflective surfacing materials of the present invention, the spacing of adjacent lens elements, defined by the ratio $d/2R$ wherein d represents the distance between centers of two adjacent lens elements and R represents the radius of each lens element, is a significant factor in the determination of the reflective intensity. The minimum spacing of the adjacent elements depends on the ratio $h/R$, and on the extent to which the reflecting surface follows the contour of the hemispherical portion of the lens element concentric thereto. The maximum fraction of the total lateral area of the optical element film occupied by lens elements is defined by the relationship $0.906 (2R/d)^2$, $d \geq 2R$. The distance d may be selected arbitrarily, but when d is less than $2(R+h)$, a portion of the reflecting surface must be removed and a loss of reflectivity occurs at large incidence angles. Normally $d/2R$ will be from about 1.0 to 1.60.

The films used to form the layers of the final retroreflective film may be made of any suitable transparent flexible material such as methyl methacrylate, flexible epoxy resins, chloro sulfonated polyethylene, polystyrene, polypropylene, polycarbonate resin, ethyl cellulose, cellulose acetate-butyrate and the like. The reflecting coat is a layer of vacuum deposited metal, such as silver, aluminum and the like.

The retroreflective films of the type illustrated by FIGS. 2 and 3 are formed by laminating together the individual film layers involved. The method of lamination by which the final film is formed may be one such as heat sealing or adhesive lamination. Heat sealing is acceptable but may give rise to some film surface distortion. This situation would be most likely to occur in the embodiment having the intermediate film layer with matched opposing substantially hemispherical projections. In this case, as well as in the other embodiment, lamination with adhesive would avoid the problems associated with heat sealing. In either mode of lamination, where the process would cause optical inactivity in those hemispherical elements involved in the lamination process, the number of such optical elements so affected must be kept at a minimum. Preferably, no more than 20 percent of the total laminate area may be optically inactivated.

Included below is an example of the present invention and an illustration of a suitable process for the production thereof; the example is not intended to be limiting. Although illustrative of the advance in the art achieved by the present invention, it is expected that those skilled in the art will be readily able to select appropriate materials and techniques of manufacture suitable to meet the requirements of any particular application.

EXAMPLE

A commercially available transparent acrylic film (Korad A-CV, Rohm and Haas Co.) having a nominal thickness of 0.003 inches is embossed on one side at a temperature of at least about 250° F. by contacting the film against an engraving roll which is provided with hemispherical protrusions having a radius of 0.0035 inches arranged in a close packing configuration with a center-to-center spacing distance of 0.005 inches between adjacent elements. The embossed side of the film is then vacuum metallized by conventional techniques. A second increment of the above-mentioned film is doubly embossed, again at a temperature of at least about 250° F. between a synchronized matched opposed pair of steel engraving rolls. The pattern on each of the rolls consists of a multiplicity of hemispherical depressions with a radius of 0.0025 inches and a depth of about 0.0015 inches, arranged in a close packing configuration corresponding to that of the first film embossing roll and having a center-to-center spacing distance of 0.005 inches between adjacent elements. The final step in the preparation of the retroreflective material is to laminate in proper alignment the first and second embossed films and an unembossed protective overlay of the same acrylic film by subjecting the three films, properly aligned, to a heat sealing operation as is conventional in the art.

The films are arranged so that the unembossed overlay layer is on top, with the doubly embossed film in the middle and the singly embossed metallized film below, with the metallized side facing the middle film. Proper alignment of the middle and lower layers is important since the spherical elements must coincide with and protrude into the metallized depressions in the lower film. The heat sealing step is conducted in such a fashion that the three films are fused and attached, preferably in a honey-comb pattern or the like, over a minimum of the area of the laminate, preferably about 20 percent of the surface area or less, since retroreflectivity is eliminated wherever sealing occurs.

The retroreflective film prepared in accordance with the foregoing procedure is examined for its optical properties under the requirements of Federal Specification L-S-300A.

What is claimed is:

1. A retroreflective laminate comprising a first film having hemispherically formed depressions of uniform size and shape on one surface thereof, said surface having a reflective material deposited thereon, a second optically transparent film with each surface being so fashioned as to form matched and opposed substantially hemispherical projections of uniform size and shape from each surface of said film, where said projections have an identical center-to-center spacing but a smaller radius than that of the hemispherical depressions of the first film, the first and second films being arranged so that the substantially hemispherical projections on one surface of the second film are matched concentrically with the hemispherical depressions of the first film to leave a space therebetween, and a third optically clear overlay film, disposed over the substantially hemispherical projections on the other surface of the second film, said overlay film making tangential contact with said projections to leave a space therebetween, the laminate being bonded together discontinuously over about 20 percent or less of the total area of the laminate to minimize optical inactivity caused by the bonding process.

2. A retroreflective laminate comprising a first film having hemispherically formed depressions of uniform size and shape on one surface thereof, said surface having a reflective material deposited thereon, a second optically transparent film having substantially hemispherical projections of uniform size and shape formed on one surface of said film, where said projections have an identical center-to-center spacing but a smaller radius than that of the hemispherical depressions of the first film, the first and second films being arranged so that the substantially hemispherical projections of the second film are matched concentrically with the hemispherical depressions of the first film to leave a space therebetween, the other surface of the second film forming an outer surface of said laminate, the laminate being bonded together discontinuously over about 20 percent or less of the total area of the laminate to minimize optical inactivity caused by the bonding process.

3. The laminate of claim 1, wherein the ratio of $h/R$ where h is the distance between the reflecting surface of the hemispherical depressions of the first film and the substantially hemispherical projections of the second film, and wherein $R$ is the radius of the matched opposing substantially hemispherical projections of the second film, is defined by the equation:

$$h/R = \frac{1\frac{1}{2} n_f}{n_f - 1}$$

where $n_f$ is the refractive index of the material of the substantially hemispherical projections within the laminate.

4. The laminate of claim 2, wherein the ratio of $h/R$ where h is the distance between the reflecting surface of the hemispherical depressions of the first film, and the substantially hemispherical projections of the second film, and wherein $R$ is the radius of the substantially hemispherical projections of the second film, is defined by the equation:

$$h/R = \frac{1}{n_f - 1}$$

where $n_f$ is the refractive index of the material of the substantially hemispherical projections within the laminate.

* * * * *

UNITED STATES PATENT OFFICE
CERTIFICATE OF CORRECTION

PATENT NO. : 3,889,027
DATED : June 10, 1975
INVENTOR(S) : Michael L. White

It is certified that error appears in the above-identified patent and that said Letters Patent are hereby corrected as shown below:

Column 2, line 4 - "pint" should be --point--.

Column 4, line 28 "a" should be --α--.

Column 5, line 45 "empty space" should be --∖--.

Signed and Sealed this

*nineteenth* Day of *August 1975*

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,889,027  Dated June 10, 1975

Inventor(s) Michael L. White

It is certified that error appears in the above-identified patent and that said Letters Patent are hereby corrected as shown below:

In column 5, line 19, change the formula to read:

$$\alpha_f = 2 \left\{ \sin^{-1}(X/R) + \sin^{-1}\left[\frac{n_f(X/R)}{1+(h/R)}\right] - \sin^{-1}[n_f(X/R)] \right\}$$

Signed and Sealed this thirtieth Day of December 1975

[SEAL]

Attest:

RUTH C. MASON
Attesting Officer

C. MARSHALL DANN
Commissioner of Patents and Trademarks